US012811611B2

(12) United States Patent
Shvodian

(10) Patent No.: US 12,811,611 B2
(45) Date of Patent: Nov. 24, 2026

(54) NETWORK AND DEVICES THAT SUPPORT DIFFERENT FREQUENCY SEPARATIONS

(71) Applicant: T-Mobile USA, Inc., Bellevue, WA (US)

(72) Inventor: William M. Shvodian, McLean, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 469 days.

(21) Appl. No.: 18/052,317

(22) Filed: Nov. 3, 2022

(65) Prior Publication Data

US 2024/0154628 A1 May 9, 2024

(51) Int. Cl.
*H04B 1/00* (2006.01)
*H04W 72/0457* (2023.01)

(52) U.S. Cl.
CPC ........ *H04B 1/005* (2013.01); *H04W 72/0457* (2023.01)

(58) Field of Classification Search
CPC ........................... H04B 1/005; H04W 72/0457
See application file for complete search history.

(56) References Cited

U.S. PATENT DOCUMENTS

2020/0029377 A1* 1/2020 Chow .................. H04W 76/15
2020/0351858 A1 11/2020 Tsai et al.
2021/0329574 A1* 10/2021 Ang ...................... H04L 5/0037
2022/0377573 A1* 11/2022 Ashworth ............. H04W 16/26
2023/0300810 A1* 9/2023 Xue .................. H04W 72/0453 370/280
2023/0354161 A1* 11/2023 Wagner ................. H04W 72/51

OTHER PUBLICATIONS

R4-2212778, Aug. 2022 (Year: 2022).*
R4-2200031, Jan. 2022 (Year: 2022).*
R4-2215942, Oct. 2022 (Year: 2022).*
R4-2215942 "Asymmetric bandwidths for APT 600 MHZ", Oct. 2022 (Year: 2022).*
R4-2212778 "SIB1 carrier-bandwidth signaling and UE specific CHBW configuration", Aug. 2022 (Year: 2022).*
(Continued)

*Primary Examiner* — Sujoy K Kundu
*Assistant Examiner* — Andrew Chanul Kim
(74) *Attorney, Agent, or Firm* — Lee & Hayes, P.C.

(57) ABSTRACT

Described herein are devices and methods, including a base station and user equipment (UE) and methods implemented by such devices. The base station may communicate using a first band, such as a n105 band, and its first transmit-receive frequency separation. The base station may also communicate with a first UE, the first UE being configured to communicate using a second band (e.g., the n71 band), using a second transmit-receive frequency separation. The first transmit-receive frequency separation may be −51 MHz and the second transmit-receive frequency separation may be −46 MHz. A second UE may communicate with the base station using the first band, and the base station may configure the second UE to use the first transmit-receive frequency separation by utilizing a UE specific channel bandwidth or carrier aggregation.

20 Claims, 9 Drawing Sheets

(56) References Cited

OTHER PUBLICATIONS

R4-2200031 “Reply LS on specification impact for methods on efficient utilization of licensed spectrum that is not aligned with existing NR channel bandwidths”, Jan. 2022 (Year: 2022).*
Apple, “On APT 600 MHz band definition for NR”, 3GPP Draft, vol. RAN WG4, Aug. 10, 2022, pp. 1-5
Ericsson, “Asymmetric bandwidths for APT 600 MHZ”, 3rd Generation Partnership Project, vol. RAN WG4, Sep. 30, 2022, pp. 1-4.
Ericsson, “SIB1 carrier-bandwidth signaling and UE specific CHBW configuration”, 3rd Generation Partnership Project, vol. RAN WG4, Aug. 10, 2022, pp. 1-8.
“Reply LS on spcification impact for methods on efficient utilization of licensed specrum that is not aligned with existing NR channel bandwidths”, 3GPP TSG-RAN WG4 Meeting#101-bis-e, Jan. 4, 2022, pp. 1-2.
Search Report for European Application No. 23207557.2, Dated Apr. 25, 2024, 13 pages.

* cited by examiner

400 – Example: 10 MHz at the Top of n105

500 – Example: 15 MHz at the Center of n105

NETWORK AND DEVICES THAT SUPPORT DIFFERENT FREQUENCY SEPARATIONS

BACKGROUND

Base stations can be configured to use different frequency bands to communicate over a given frequency range. For example, both the n71 band and n105 band can communicate over the 600 MHz frequency range. Those different bands may utilize different transmit-receive frequency separations and different ranges for uplink and downlink, however. The n71 band uses 617 MHz to 652 MHz as its downlink range and −46 MHz as its transmit-receive frequency separation, while the n105 band uses 612 MHz to 652 MHz as its downlink range and −51 MHz as its transmit-receive frequency separation. If the bottom parts of the frequency ranges of two bands do not align and their transmit-receive frequency separations differ, there may be difficulty supporting user equipment (UE) that are only configured to use one of the two frequency bands.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
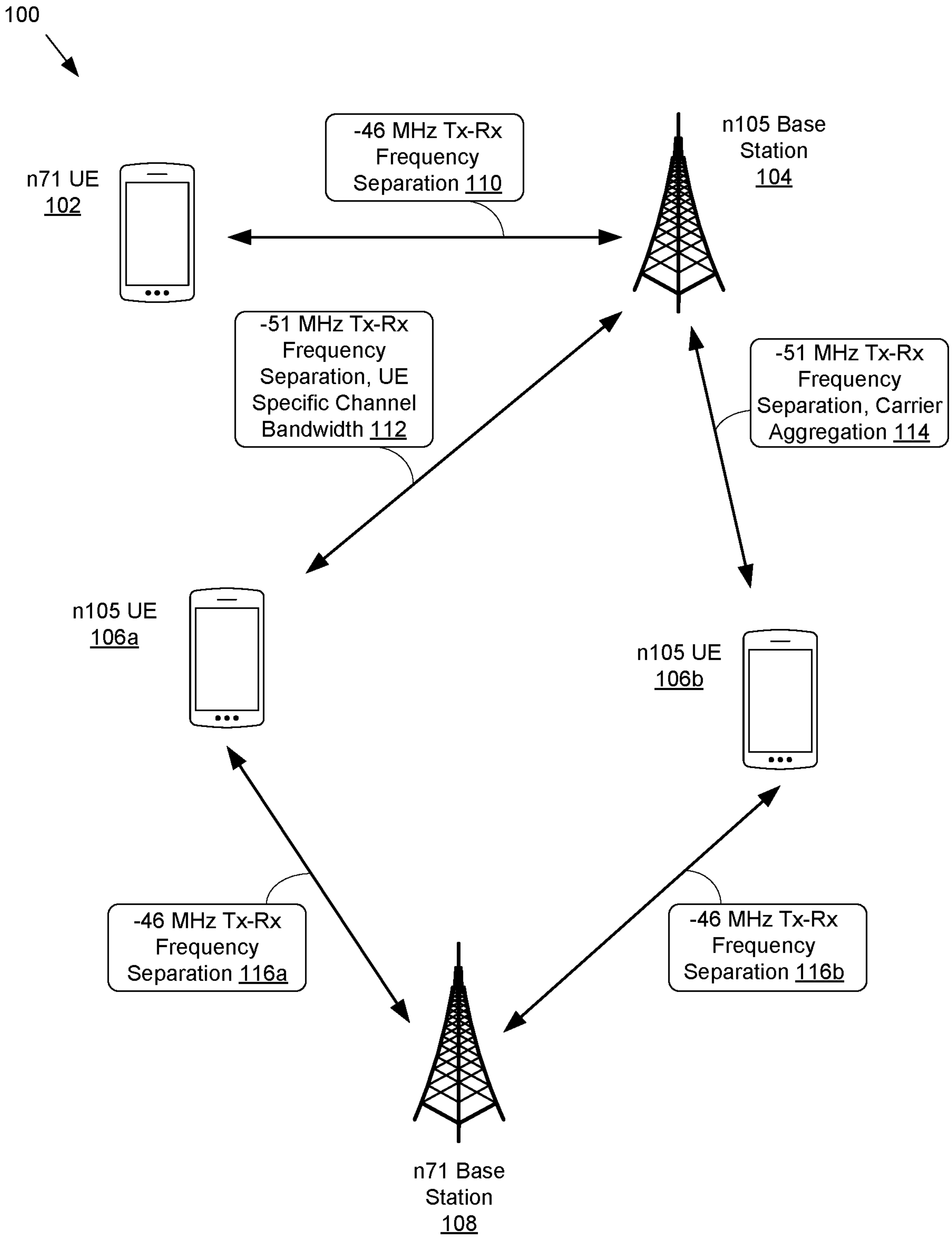
FIG. 1 shows an example of a network environment with a base station configured to communicate with UEs over one frequency band, e.g., n105, using two different transmit-receive frequency separations, depending on the capabilities of the UEs.

Described herein are devices and methods, including base stations and UEs and methods implemented by such devices. A base station may communicate using a first band, such as a n105 band, and its first transmit-receive frequency separation. The base station may also communicate with a first UE, the first UE being configured to communicate using a second band (e.g., the n71 band), using a second transmit-receive frequency separation using the multiple frequency band list. The first transmit-receive frequency separation may be −51 MHz and the second transmit-receive frequency separation may be −46 MHz. The licensed spectrum has the −51 MHz transmit-receive frequency separation, and configurations of the base station allow for n71 UEs to be compatible with such licensed spectrum. Also, a second UE may communicate with the base station using the first band, and the base station may configure the second UE to use the first transmit-receive frequency separation by utilizing a UE specific channel bandwidth or carrier aggregation.

As mentioned above, the n71 band is located in the 600 MHz spectrum range, with a downlink range from 617 MHz to 652 MHz and an uplink range from 663 MHz to 698 MHz. The n105 band is located in the 600 MHz spectrum range, with a downlink range from 612 MHz to 652 MHz and an uplink range from 663 MHz to 703 MHz.

While reference is made herein to the n71 band and n105 band, it is to be understood that the devices and methods described in this disclosure apply to any two bands having overlapping frequency ranges with unaligned bottom frequencies and different transmit-receive frequency separations.

In various implementations, an n105 base station receives a message from a first UE indicating that the first UE is capable of communicating on a n71 band and, in response, configures the first UE with uplink and downlink spectrum allocations using a −46 MHz transmit-receive frequency separation. Additionally, the n105 base station may receive a message from a second UE indicating that the second UE is capable of communicating on the n105 band. In response, the n105 base station configures the second UE with uplink and downlink spectrum allocations using a −51 MHz transmit-receive frequency separation by utilizing either a UE specific channel bandwidth or carrier aggregation.

In some implementations, the UE specific channel bandwidth is not centered on a 100 KHz raster. Further, the UE specific channel bandwidth may be larger than a SIB1 bandwidth, with the SIB1 bandwidth having a −46 MHz transmit-receive frequency separation for compatibility with n71 UEs. In some examples, the UEs may indicate their support for, e.g., UE specific channel bandwidths, multiple transmit-receive frequency separations, asymmetric channel bandwidths, etc., using UE capabilities. In some cases, some features are mandatory, such as asymmetric BCS0 which is mandatory for all n71 UEs. The n105 base station may utilize a UE specific channel bandwidth when a UE supports it and supports the n105 band. For other n105 UEs, the n105 base station may utilize carrier aggregation.

In further implementations, a n105 UE may provide an indication to a n105 base station that the UE is capable of communicating over a n105 frequency band. In response, the n105 UE may receive from the base station configuration information specifying uplink and downlink spectrum allocations using a −51 MHz transmit-receive frequency separation by utilizing either a UE specific channel bandwidth or carrier aggregation.

As noted herein, the UE specific channel bandwidth is not centered on a 100 KHz raster and may be larger than a SIB1 bandwidth of the SIB1 message from the n105 base station, with the SIB1 bandwidth having a −46 MHz transmit-receive frequency separation for compatibility with n71 UEs. In some implementations, the n105 UE provides an indication to a n71 base station that the n105 UE is capable of communicating over the n71 frequency band and the n105 frequency band. In response, the n105 UE receives from the n71 base station configuration information specifying uplink and downlink spectrum allocations using a −46 MHz transmit-receive frequency separation.

Example Network Environment

FIG. 1 shows an example of a network environment 100 with a base station configured to communicate with UEs over one frequency band, e.g., n105, using two different transmit-receive frequency separations depending on the capabilities of the UEs. As illustrated, a UE 102 that is capable of communicating using a n71 band but not a n105 band (also referred to herein as "n71 UE 102") may connect to and communicate with a base station 104, the base station 104 capable of communicating over the n105 band (also referred to herein as "n105 base station 104"). UEs 106*a* and 106*b* are capable of communicating using the n105 band (also referred to herein as "n105 UE 106*a*" and "n105 UE 106*b*") and also connect to and communicate with the base station 104. Further, the UEs 106*a* and 106*b* may also communicate using the n71 band and can connect to and communicate with a base station 108, the base station 108 being capable of communicating over the n71 band (also referred to herein as "n71 base station 108"). As further shown, the UE 102 and base station 104 may communicate 110 using a −46 MHz transmit-receive frequency separation, the UE 106*a* may communicate 112 using a −51 MHz transmit-receive frequency separation and a UE specific channel bandwidth, and the UE 106*b* may communicate 114 using a −51 MHz transmit-receive frequency separation and carrier aggregation. Additionally, UE 106*a* may communicate 116*a* with the base station 108 using a −46 MHz transmit-receive frequency separation, and the UE 106*b* may communicate 116*b* with the base station 108 using a −46 MHz transmit-receive frequency separation.

In various implementations, UE 102 may be any sort of device capable of communicating with base stations and access networks, including devices capable of communicating over licensed spectrum, unlicensed spectrum, or both. Examples of UE 102 may include cellular devices, mobile devices, Internet-of-Things (IoT) devices, augmented reality/virtual reality (AR/VR) devices, wearable devices, laptops, desktops, media players, gaming devices, or any other sort of computing device of any form factor. The UE 102 may support any sort of radio access type, such as 5G/NR, 4G/LTE, and may also support Wi-Fi communication. As described herein, UE 102 is a device that is configured to communicate over a n71 band but is not configured to communicate over a n105 band. There may be other frequency bands that the UE 102 is configured to communicate over or not configured to communicate over. The UE 102 may be able to support variable transmit-receive frequency separations but need not. As such, some subset of UEs 102 may support the −46 MHz transmit-receive frequency separation and the −51 MHz transmit-receive frequency separation. But other UEs 102 may not support variable transmit-receive frequency separations or may not support the −51 MHz transmit-receive frequency separation. Additionally, UE 102 may support asymmetric channel bandwidths, such as those specified in a bandwidth combination set (BCS) such as BCS0 (mandatory), BCS1, and BCS2, which are reproduced here:

| | | | |
|---|---|---|---|
| n71 | 5 | 10 | 0 |
| | 10 | 15 | |
| | 15 | 20 | |
| | 5 | 10 | 1 |
| | 10 | 15 | |
| | 15 | 20 | |
| | 20 | 35 | |
| | 20 | 25, 30, 35 | 2 |

The second column includes uplink channel bandwidths and the third column includes corresponding downlink channel bandwidths. The fourth column designates the BCS number that corresponds to the uplink/downlink combinations shown to its left.

In further implementations, UEs 106*a* and 106*b* (also referred to as "UE 106" or "UEs 106") may be any sort of device capable of communicating with base stations and access networks, including devices capable of communicating over licensed spectrum, unlicensed spectrum, or both. Examples of UEs 106 may include cellular devices, mobile devices, IoT devices, AR/VR devices, wearable devices, laptops, desktops, media players, gaming devices, or any other sort of computing device of any form factor. The UEs 106 may support any sort of radio access type, such as 5G/NR, 4G/LTE, and may also support Wi-Fi communication. As described herein, UEs 106 are devices that are configured to communicate over both the n71 band and the n105 band. There may be other frequency bands that the UEs 106 are configured to communicate over or not configured to communicate over. The UEs 106 support the −46 MHz transmit-receive frequency separation and the −51 MHz transmit-receive frequency separation. In some implementations, the UEs 106 may provide UE capabilities, such as capabilities indicating whether the UEs 106 support any or all of UE specific channel bandwidths, bandwidths not centered on a 100 KHz raster, or bandwidths wider than a SIB1 bandwidth of a SIB1 message from a base station, such as base station 104. Further, the UEs 106 may support carrier aggregation. Additionally, UEs 106 support asymmetric channel bandwidths, such as those specified here:

| NR Band | Channel bandwidths for UL (MHz) | Channel bandwidths for DL (MHz) | Asymmetric channel bandwidth combination set |
|---|---|---|---|
| n105 | 5 | 10 | 0 |
| | 10 | 15 | |
| | 15 | 20 | |
| | 20 | 25, 30, 35, 40 | |

Figure 7:
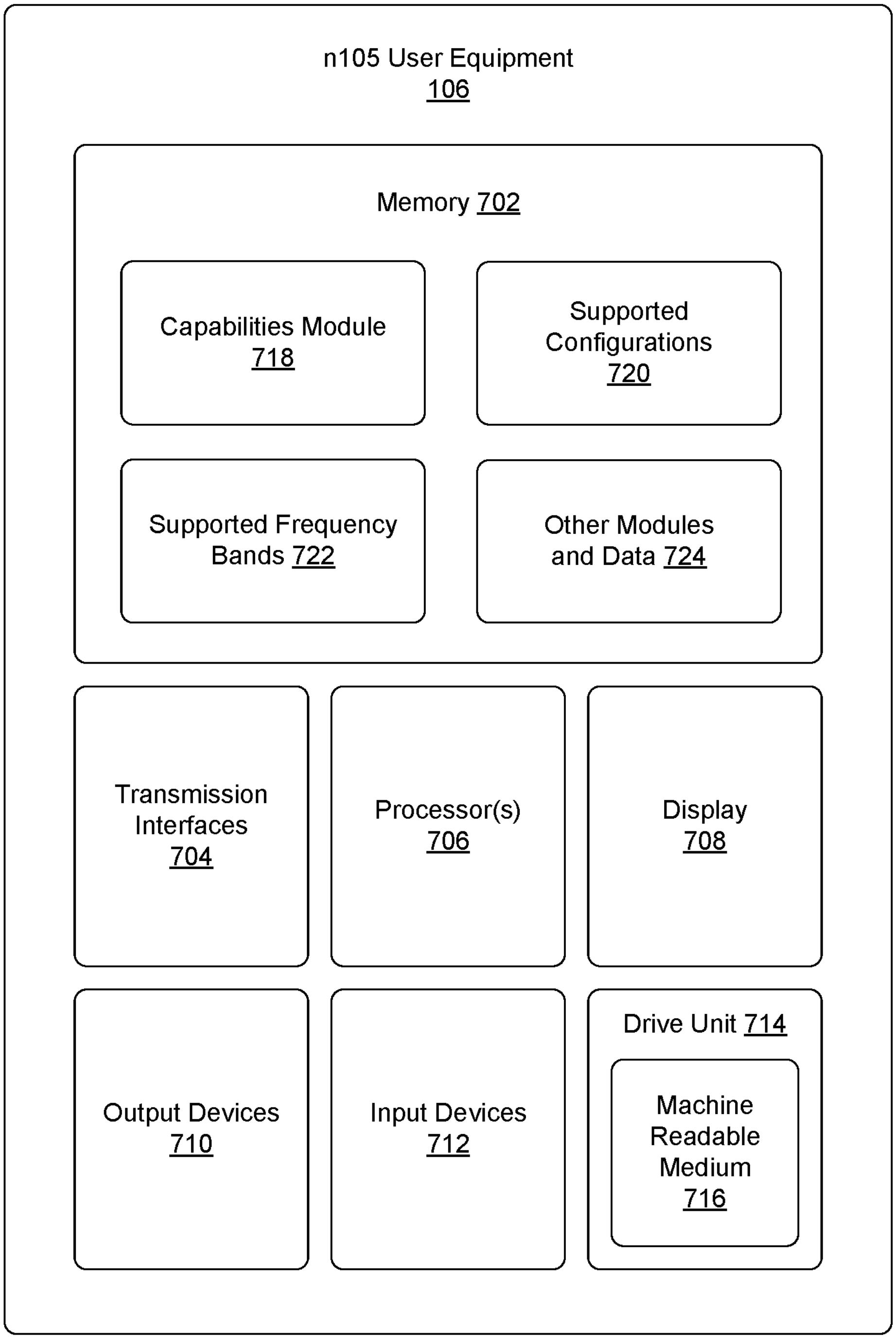
FIG. 7 shows an example of a system architecture for a UE.

An example system architecture of a UE 106 is shown in FIG. 7 and described below in detail with reference to that figure.

In various implementations, the base station 104 may be any sort of radio access point associated with a radio access network. The base station 104 may be associated with a cell site having one or more base stations. The cell site has a geographic area and may have other network equipment. The base station 104 may be associated with a specific radio access type, such as 5G NR or a newer generation radio access type. Such a 5G NR base station 104 may be a gNode B (gNB) or newer type. The base station 104 may broadcast a synchronization message over a frequency band, such as the n105 band, that includes a SSB message. The SSB message in turn includes a SIB1 message. The base station 104 may also be capable of engaging in control communications, such as RRC communications, may receive uplink communications over a band supported by the base station 104, and may provide downlink communications over a band supported by the base station 104. Particular parts of supported spectrum may be assigned to specific UEs by the scheduler of the base station 104 and used for control plane and user plane communications. As shown in FIG. 1, base station 104 is capable of communicating over the n105 band using both a −46 MHz transmit-receive frequency separation and a −51 MHz transmit-receive frequency separation. Example configurations deployed by the base station 104 are illustrated in FIGS. 2-5 and described further herein, and an example system architecture for base station 104 is shown in FIG. 6 and described further herein.

In various implementations, the base station 108 may be any sort of radio access point associated with a radio access network. The base station 108 may be associated with a cell site having one or more base stations. The cell site has a geographic area and may have other network equipment. The base station 108 may be associated with a specific radio access type, such as 5G NR or a newer generation radio access type. Such a 5G NR base station 108 may be a gNB or newer type. The base station 108 may broadcast a synchronization message over a frequency band, such as the n71 band, that includes a SSB message. The SSB message in turn includes a SIB1 message which contains the cell specific channel bandwidths for uplink and downlink. The base station 108 may also be capable of engaging in control communications, such as RRC communications, may receive uplink communications over a band supported by the base station 108, and may provide downlink communications over a band supported by the base station 108. Particular parts of supported spectrum may be assigned to specific UEs by the scheduler of the base station 108 and used for control plane and user plane communications. As shown in FIG. 1, base station 108 is capable of communicating over the n71 band using a −46 MHz transmit-receive frequency separation.

In some implementations, the UE 102 may establish communication 110 with the base station 104 using a −46 MHz transmit-receive frequency separation even though the base station 104 is an n105 base station that also supports a −51 MHz transmit-receive frequency separation. The base station 104 may broadcast an SSB using the −46 MHz transmit-receive frequency separation which the UE 102, as an n71 UE, is capable of receiving and understanding. Using information from the SSB, the UE 102 may engage in RRC communications with the base station 104. The UE 102 may indicate the frequency bands it supports (here, n71, but not n105) and may further indicate UE capabilities. Based on the indication of supported frequency bands and UE capabilities, the base station 104 configures the UE 102. Examples of these configurations are shown in FIGS. 2-5 and described further herein. Based on the part of the n105 band allocated to the UE 102, the uplink frequency allocation and the downlink frequency allocation may be of a same bandwidth or may be asymmetric bandwidths such as those specified in BCS0, BCS1, or BCS2. In either circumstance, the uplink and downlink frequency allocations will have a −46 MHz transmit-receive frequency separation. In an RRC response, the base station 104 indicates the uplink and downlink frequency allocations for the UE 102, and the UE 102 and base station 104 proceed to use those allocations for communication 110.

In various implementations, the UE **106*a* may establish communication 112 with the base station 104 using a −51 MHz transmit-receive frequency separation and UE specific channel bandwidth, and the UE 106*b* may establish communication 114 with the base station 104 using a −51 MHz transmit-receive frequency separation and carrier aggregation. The base station 104 may broadcast an SSB using the −46 MHz transmit-receive frequency separation which the UEs 106**, as n105 UEs, are capable of receiving and understanding. As noted herein, n105 UEs can support both n71 and n105 bands and the respective −46 MHz and −51 MHz transmit-receive frequency separations.

Using information from the SSB, the UEs 106 may engage in RRC communications with the base station 104. The UEs 106 may indicate the frequency bands they support (here, n71 and n105) and may further indicate UE capabilities. Such UE capabilities may include whether the UEs 106 support any or all of UE specific channel bandwidths, bandwidths not centered on a 100 KHz raster, or bandwidths wider than a SIB1 bandwidth of a SIB1 message from a base station, such as base station 104. Based on the indication of supported frequency bands and UE capabilities, the base station 104 configures the UEs 106. Examples of these configurations are shown in FIGS. 2-5 and described further herein. The uplink and downlink frequency allocations will have a −51 MHz transmit-receive frequency separation. To achieve a −51 MHz transmit-receive frequency separation when the SIB1 message of the base station 104 uses a −46 MHz separation, the base station 104 utilizes either a UE specific channel bandwidth that differs from (is larger than) the cell specific channel bandwidth included in the SIB1 message or carrier aggregation. For communication 112, the base station configures UE **106*a* with a UE specific channel bandwidth. This selection may be based, for example, on UE capabilities indicating that the UE 106*a* is capable of communicating using a UE specific channel bandwidth. For communication 114, the base station configures UE 106*b* using carrier aggregation. Such a choice may or may not be based on UE capabilities. In an RRC response, the base station 104 indicates the uplink and downlink frequency allocations for the UEs 106 to the UEs 106, and the UEs 106 and base station 104 proceed to use those allocations for communications 112 and 114**.

Returning to communication 110, in some implementations the UE 102 may indicate that it supports variable transmit-receive frequency separations, including a −51 MHz transmit-receive frequency separation. In such implementations, the base station 104 may assign frequency allocations having a −51 MHz transmit-receive frequency separation in the same manner as such allocations are made to UEs 106 (e.g., using UE specific channel bandwidths or carrier aggregation).

In various implementations, the UEs 106 may establish communications 116 with the base station 108 (including communication **116*a* between UE 106*a* and base station 108 and communication 116*b* between UE 106*b* and base station 108) using a −46 MHz transmit-receive frequency separation, While the UEs 106 are capable of communicating using a −46 MHz transmit-receive frequency separation and a −51 MHz transmit-receive frequency separation, the base station 108 is an n71 base station and uses a −46 MHz transmit-receive frequency separation. The base station 108 may broadcast an SSB using the −46 MHz transmit-receive frequency separation. Using information from the SSB, the UEs 106 may engage in RRC communications with the base station 108. The UEs 106 may indicate the frequency bands they support (here, n71 and n105) and may further indicate UE capabilities. Based on the indication of supported frequency bands and UE capabilities, the base station 108 configures the UEs 106. The uplink frequency allocation and the downlink frequency allocation may be of a same bandwidth or may be asymmetric bandwidths such as those specified in BCS0, BCS1, or BCS2. Also, the uplink and downlink frequency allocations will have a −46 MHz transmit-receive frequency separation. In an RRC response, the base station 108 indicates the uplink and downlink frequency allocations for the UEs 106, and the UEs 106 and base station 108 proceed to use those allocations for the communications 116**.

Example Configurations

Figure 2:
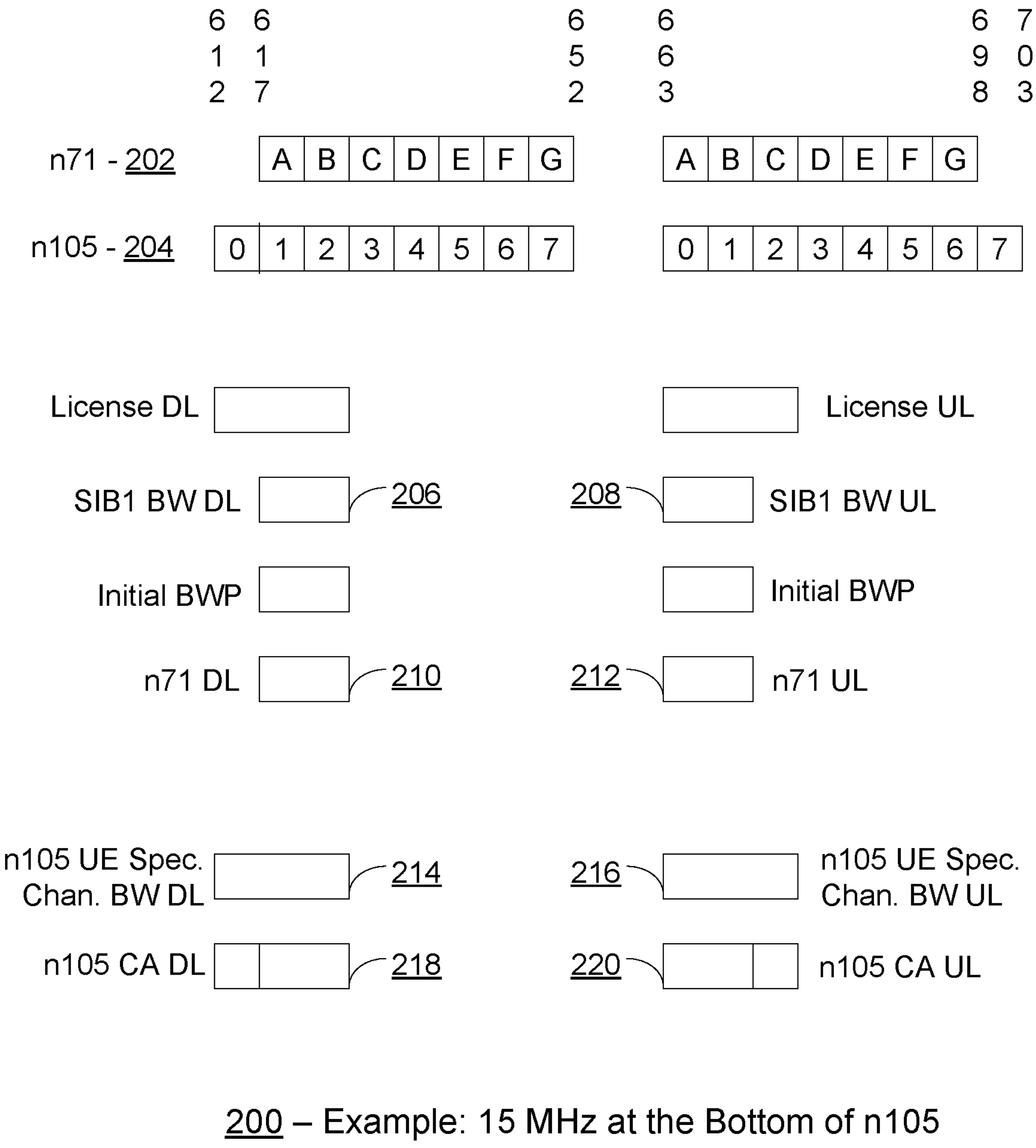
FIG. 2 shows an example configuration of uplink and downlink allocations for UEs, the allocations being made with up to 15 MHz at the bottom of the n105 band.

FIG. 2 shows an example configuration 200 of uplink and downlink allocations for UEs, the allocations being made with up to 15 MHz at the bottom of the n105 band. As illustrated, the downlink frequency range for n71 band 202 extends from 617 MHz to 652 MHz and is shown with blocks of spectrum in 5 MHz increments which, for the sake of illustration, are labeled 'A' through 'G'. The uplink frequency range for n71 band 202 extends from 663 MHz to 698 MHz and is shown with blocks of spectrum in 5 MHz increments which, for the sake of illustration, are labeled 'A' through 'G'. For the n105 band 204, the downlink frequency range extends from 612 MHz to 652 MHz and is shown with blocks of spectrum in 5 MHz increments which, for the sake of illustration, are labeled '0' through '7'. The uplink frequency range of the n105 band 204 extends from 663 MHz to 703 MHz and is shown with blocks of spectrum in 5 MHz increments which, for the sake of illustration, are labeled '0' through '7'.

In various implementations, a network operator associated with a n105 base station, such as base station 104, may have a license to only part of an n71 band or n105 band. In FIG. 2, the licensed downlink and uplink are shown as the bottom parts of the frequency ranges for n105 band 204—from 612 MHz to 627 MHz and from 663 MHz to 678 MHz. The licensed ranges thus have a −51 MHz transmit-receive frequency separation. In broadcasting to a surrounding area, however, the n105 base station may use a −46 MHz separation to be compatible with both n71 UEs (e.g., UE 102) and n105 UEs (e.g., UEs 106). To use a −46 MHz separation, the n105 base station uses a subset of the licensed frequency ranges. For example, the n105 base station may use from 617 MHz to 627 MHz downlink range and from the 663 MHz to 673 MHz uplink range. The broadcast from the n105 base station may include the SSB, which in turn may include the downlink SIB1 bandwidth 206, the uplink SIB1 bandwidth 208, the downlink initial bandwidth part, and the uplink initial bandwidth part. The SIB1 message included in the SSB may also specific a cell specific channel bandwidth, which may be the same as a SIB1 bandwidth and smaller than a licensed bandwidth. For example, the licensed downlink range is 15 MHz in length, which the SIB1 bandwidth 206 is 10 MHz in length. The cell specific channel bandwidth may also be 10 MHz.

When a n71 UE connects to the n105 base station, the n105 base station may determine that the n71 UE is an n71 UE and configure the n71 UE with uplink and downlink frequency allocations from the n71 downlink 210 and from the n71 uplink 212, with the allocations having a −46 MHz transmit-receive frequency separation. Such indications of capabilities of the n71 UE and configurations from the n105 base station may be exchanged in RRC communications.

When a n105 UE connects to the n105 base station, the n105 base station may determine that the n105 UE is an n105 UE and configure the n105 UE with uplink and downlink frequency allocations using either UE specific channel bandwidths or carrier aggregation. UE specific channel bandwidths use a −51 MHz transmit-receive frequency separation between the downlink and uplink and may be taken from the entire licensed downlink range and uplink range. The UE specific channel bandwidths may also be larger than the cell specific channel bandwidth. For example, a UE specific channel bandwidth may be 15 MHz and a cell specific channel bandwidth may be 10 MHz. In FIG. 2, the UE specific channel bandwidth downlink 214 is from 612 MHz to 627 MHz and the UE specific channel bandwidth uplink 216 is from 663 MHz to 678 MHz, and uplink and downlink frequency allocations for n105 UEs will may utilize those UE specific channel bandwidths. Alternatively, the n105 base station may utilize carrier aggregation to provide an effective −51 MHz transmit-receive frequency separation. For example, the primary cells for downlink and uplink may each be of 10 MHz length and the secondary cells may each be 5 MHz. Thus, the effective downlink 218 is 15 MHz (10 MHz+5 MHz) and the effective uplink 220 using carrier aggregation is 15 MHz (10 MHz+5 MHz). The n105 base station may configure the n105 UEs using either the UE specific channel bandwidth or carrier aggregation (depending, e.g., on what the n105 UE supports), and capabilities of the n105 UEs and configurations from the n105 base station may be exchanged in RRC communications.

Figure 3:
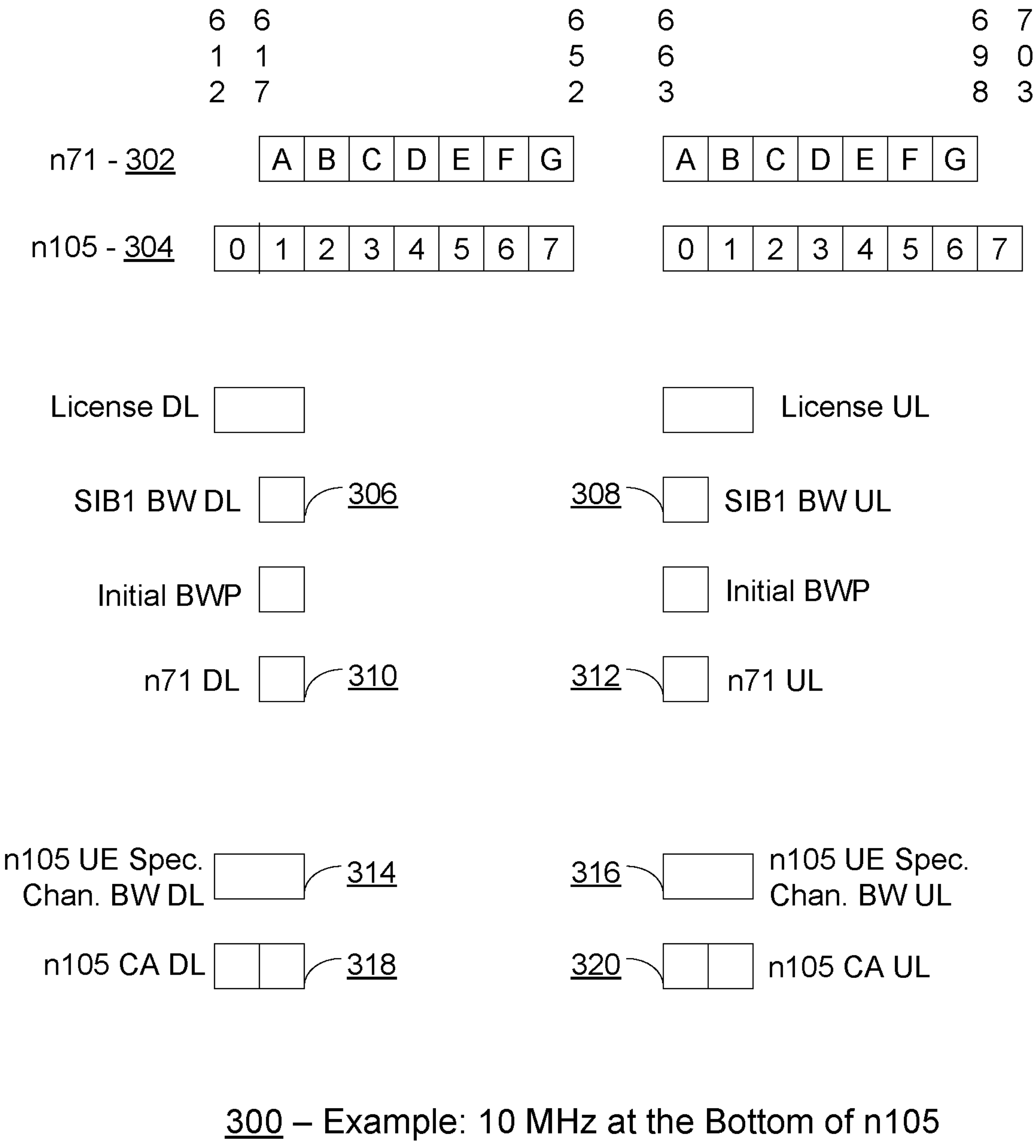
FIG. 3 shows an example configuration of uplink and downlink allocations for UEs, the allocations being made with up to 10 MHz at the bottom of the n105 band.

FIG. 3 shows an example configuration 300 of uplink and downlink allocations for UEs, the allocations being made with up to 10 MHz at the bottom of the n105 band. As illustrated, the downlink frequency range for n71 band 302 extends from 617 MHz to 652 MHz and is shown with blocks of spectrum in 5 MHz increments which, for the sake of illustration, are labeled 'A' through 'G'. The uplink frequency range for n71 band 302 extends from 663 MHz to 698 MHz and is shown with blocks of spectrum in 5 MHz increments which, for the sake of illustration, are labeled 'A' through 'G'. For the n105 band 304, the downlink frequency range extends from 612 MHz to 652 MHz and is shown with blocks of spectrum in 5 MHz increments which, for the sake of illustration, are labeled '0' through '7'. The uplink frequency range of the n105 band 304 extends from 663 MHz to 703 MHz and is shown with blocks of spectrum in 5 MHz increments which, for the sake of illustration, are labeled '0' through '7'.

In various implementations, a network operator associated with a n105 base station, such as base station 104, may have a license to only part of an n71 band or n105 band. In FIG. 3, the licensed downlink and uplink are shown as the bottom parts of the frequency ranges for n105 band 304—from 612 MHz to 622 MHz and from 663 MHz to 673 MHz. The licensed ranges thus have a −51 MHz transmit-receive frequency separation. In broadcasting to a surrounding area, however, the n105 base station may use a −46 MHz separation to be compatible with both n71 UEs (e.g., UE 102) and n105 UEs (e.g., UEs 106). To use a −46 MHz separation, the n105 base station uses a subset of the licensed frequency ranges. For example, the n105 base station may use from 617 MHz to 622 MHz downlink range and from the 663 MHz to 668 MHz uplink range. The broadcast from the n105 base station may include the SSB, which in turn may include the downlink SIB1 bandwidth 306, the uplink SIB1 bandwidth 308, the downlink initial bandwidth part, and the uplink initial bandwidth part. The SIB1 message included in the SSB may also specific a cell specific channel bandwidth, which may be the same as a SIB1 bandwidth and smaller than a licensed bandwidth. For example, the licensed downlink range is 10 MHz in length, which the SIB1 bandwidth 306 is 5 MHz in length. The cell specific channel bandwidth may also be 5 MHz.

When a n71 UE connects to the n105 base station, the n105 base station may determine that the n71 UE is an n71

UE and configure the n71 UE with uplink and downlink frequency allocations from the n71 downlink 310 and from the n71 uplink 312, with the allocations having a −46 MHz transmit-receive frequency separation. Such indications of capabilities of the n71 UE and configurations from the n105 base station may be exchanged in RRC communications.

When a n105 UE connects to the n105 base station, the n105 base station may determine that the n105 UE is an n105 UE and configure the n105 UE with uplink and downlink frequency allocations using either UE specific channel bandwidths or carrier aggregation. UE specific channel bandwidths use a −51 MHz transmit-receive frequency separation between the downlink and uplink and may be taken from the entire licensed downlink range and uplink range. The UE specific channel bandwidths may also be larger than the cell specific channel bandwidth. For example, a UE specific channel bandwidth may be 10 MHz and a cell specific channel bandwidth may be 5 MHz. In FIG. 3, the UE specific channel bandwidth downlink 314 is from 612 MHz to 622 MHz and the UE specific channel bandwidth uplink 316 is from 663 MHz to 673 MHz, and uplink and downlink frequency allocations for n105 UEs will may utilize those UE specific channel bandwidths. Alternatively, the n105 base station may utilize carrier aggregation to provide an effective −51 MHz transmit-receive frequency separation. For example, the primary cells for downlink and uplink may each be of 5 MHz length and the secondary cells may each be 5 MHz. Thus, the effective downlink 318 is 10 MHz (5 MHz+5 MHz) and the effective uplink 320 using carrier aggregation is 10 MHz (5 MHz+5 MHz). The n105 base station may configure the n105 UEs using either the UE specific channel bandwidth or carrier aggregation (depending, e.g., on what the n105 UE supports), and capabilities of the n105 UEs and configurations from the n105 base station may be exchanged in RRC communications.

Figure 4:
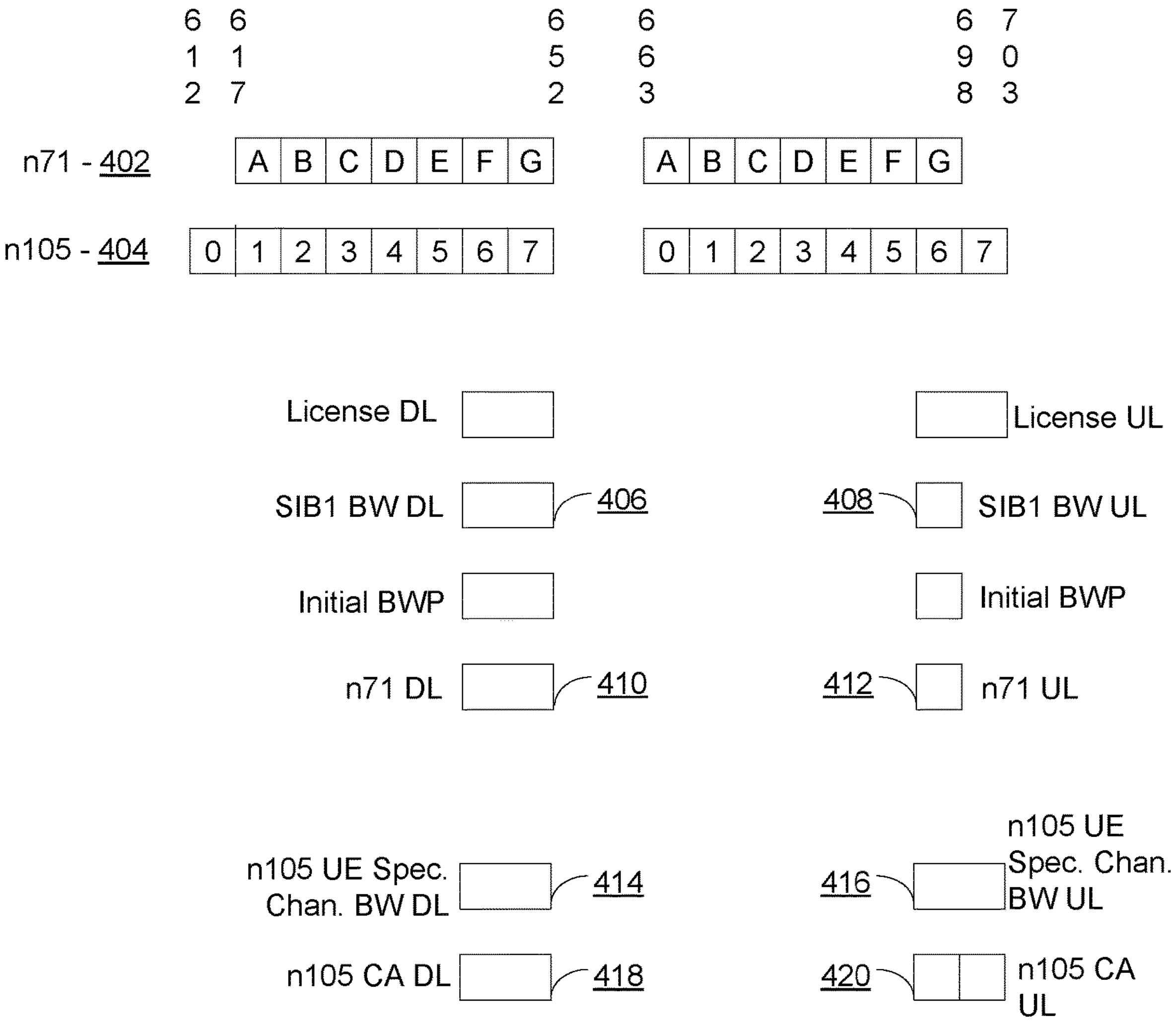
FIG. 4 shows an example configuration of uplink and downlink allocations for UEs, the allocations being made with up to 10 MHz at the top of the n105 band.

FIG. 4 shows an example configuration 400 of uplink and downlink allocations for UEs, the allocations being made with up to 10 MHz at the top of the n105 band. As illustrated, the downlink frequency range for n71 band 402 extends from 617 MHz to 652 MHz and is shown with blocks of spectrum in 5 MHz increments which, for the sake of illustration, are labeled ‘A’ through ‘G’. The uplink frequency range for n71 band 402 extends from 663 MHz to 698 MHz and is shown with blocks of spectrum in 5 MHz increments which, for the sake of illustration, are labeled ‘A’ through ‘G’. For the n105 band 404, the downlink frequency range extends from 612 MHz to 652 MHz and is shown with blocks of spectrum in 5 MHz increments which, for the sake of illustration, are labeled ‘0’ through ‘7’. The uplink frequency range of the n105 band 404 extends from 663 MHz to 703 MHz and is shown with blocks of spectrum in 5 MHz increments which, for the sake of illustration, are labeled ‘0’ through ‘7’.

In various implementations, a network operator associated with a n105 base station, such as base station 104, may have a license to only part of an n71 band or n105 band. In FIG. 4, the licensed downlink and uplink are shown as the top parts of the frequency ranges for n105 band 404—from 642 MHz to 652 MHz and from 693 MHz to 703 MHz. The licensed ranges thus have a −51 MHz transmit-receive frequency separation. All of those ranges or a subset may be used, depending on the connecting UEs and their capabilities. For an n105 UE, both licensed frequency ranges may be completely used. For n71 UEs, if those UEs support variable transmit-receive frequency separations, both licensed frequency ranges may be completely used. For n71 UEs that do not support variable transmit-receive frequency separations, the full downlink licensed frequency range may be used, but only a subset of the uplink licensed frequency range may be used. This is because n71 UEs support asymmetric channel bandwidths as defined in BCS0, BCS1, and BCS2, and those allow for some combinations of downlink and uplink where the length of the downlink exceeds the uplink.

For example, the n105 base station may use from 642 MHz to 652 MHz downlink range and from the 693 MHz to 698 MHz uplink range. The broadcast from the n105 base station may include the SSB, which in turn may include the downlink SIB1 bandwidth 406, the uplink SIB1 bandwidth 408, the downlink initial bandwidth part, and the uplink initial bandwidth part. The SIB1 message included in the SSB may also specific a cell specific channel bandwidth, which may be the same as a SIB1 bandwidth and smaller than a licensed bandwidth. For example, the licensed uplink range is 10 MHz in length, for which the uplink SIB1 bandwidth 408 is 5 MHz in length. The cell specific channel bandwidth may also be 5 MHz.

When a n71 UE connects to the n105 base station, the n105 base station may determine that the n71 UE is an n71 UE and configure the n71 UE with uplink and downlink frequency allocations from the n71 downlink 410 and from the n71 uplink 412. Such indications of capabilities of the n71 UE and configurations from the n105 base station may be exchanged in RRC communications.

When a n105 UE connects to the n105 base station, the n105 base station may determine that the n105 UE is a n105 UE and configure the n105 UE with uplink and downlink frequency allocations using either UE specific channel bandwidths or carrier aggregation. UE specific channel bandwidths use a −51 MHz transmit-receive frequency separation between the downlink and uplink and may be taken from the entire licensed downlink range and uplink range. The UE specific channel bandwidths may also be larger than the cell specific channel bandwidth. For example, a UE specific channel bandwidth may be 10 MHz and a cell specific channel bandwidth may be 5 MHz. In FIG. 4, the UE specific channel bandwidth downlink 414 is from 642 MHz to 652 MHz and the UE specific channel bandwidth uplink 416 is from 693 MHz to 703 MHz, and uplink and downlink frequency allocations for n105 UEs will may utilize those UE specific channel bandwidths. Alternatively, the n105 base station may utilize carrier aggregation to provide an effective −51 MHz transmit-receive frequency separation. For example, the primary cells for downlink and uplink may each be of 5 MHz length and the secondary cells may each be 5 MHz. Thus, the effective downlink 418 is 10 MHz (5 MHz+5 MHz) and the effective uplink 420 using carrier aggregation is 10 MHz (5 MHz+5 MHz). The n105 base station may configure the n105 UEs using either the UE specific channel bandwidth or carrier aggregation (depending, e.g., on what the n105 UE supports), and capabilities of the n105 UEs and configurations from the n105 base station may be exchanged in RRC communications.

Figure 5:
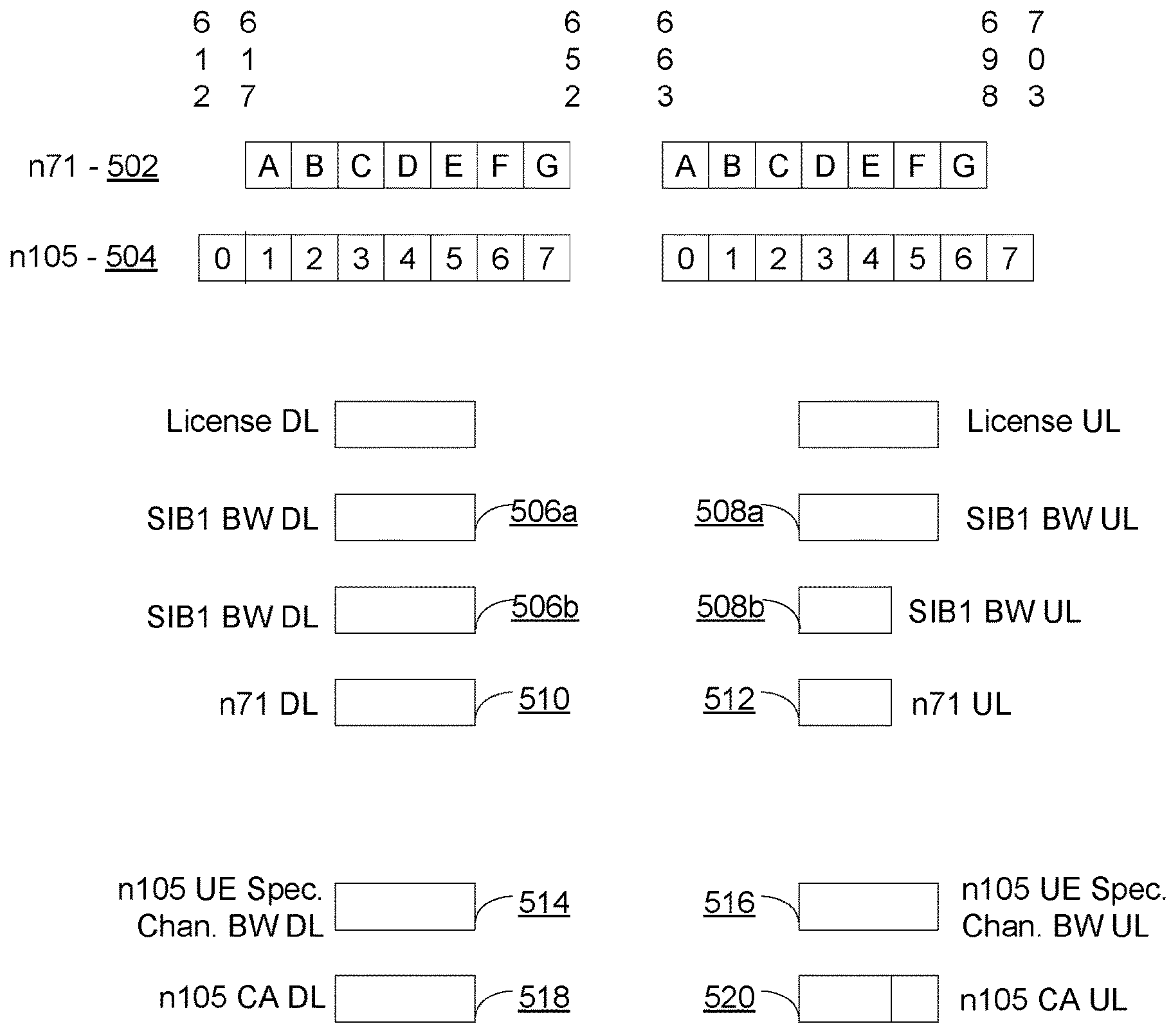
FIG. 5 shows an example configuration of uplink and downlink allocations for UEs, the allocations being made with up to 15 MHz at the center of the n105 band.
Figure 6:
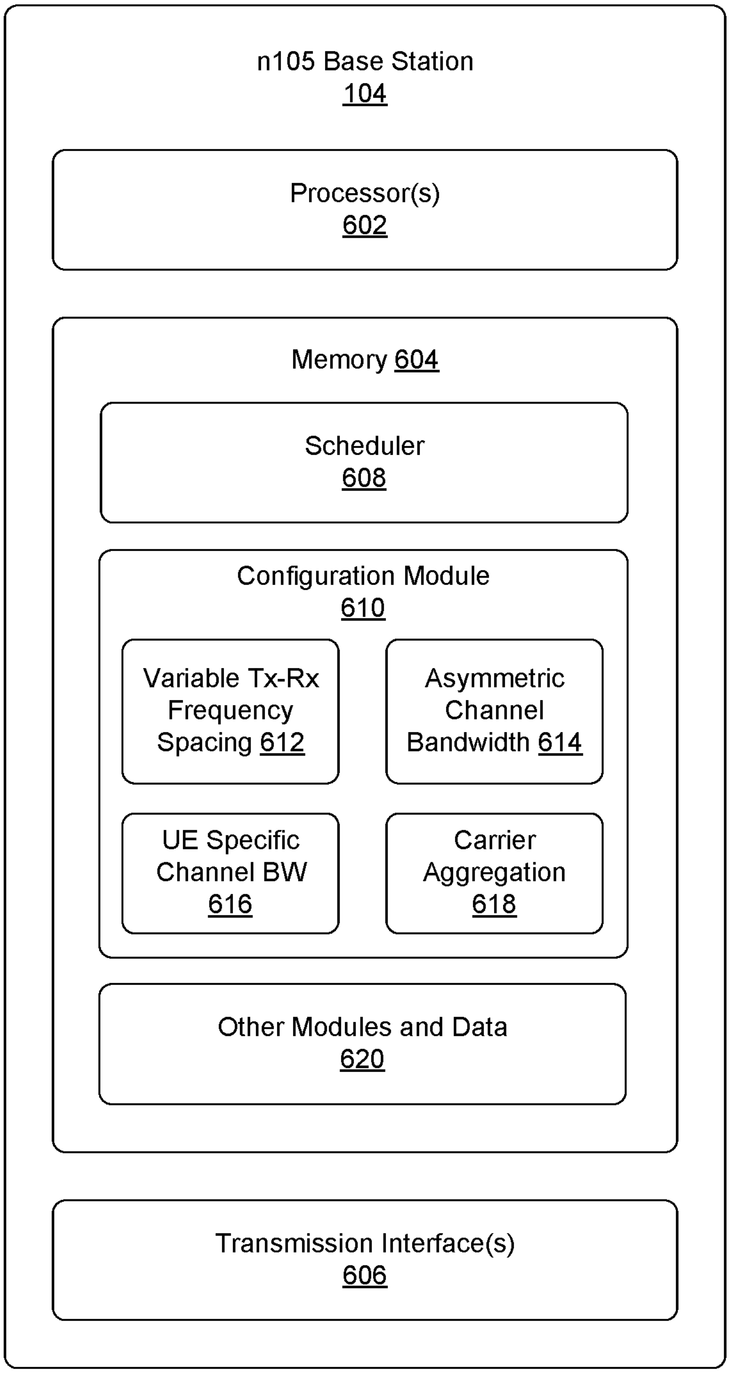
FIG. 6 shows an example of a system architecture for the base station.

FIG. 5 shows an example configuration 500 of uplink and downlink allocations for UEs, the allocations being made with up to 15 MHz at the center of the n105 band. As illustrated, the downlink frequency range for n71 band 502 extends from 617 MHz to 652 MHz and is shown with blocks of spectrum in 5 MHz increments which, for the sake of illustration, are labeled ‘A’ through ‘G’. The uplink frequency range for n71 band 502 extends from 663 MHz to 698 MHz and is shown with blocks of spectrum in 5 MHz increments which, for the sake of illustration, are labeled ‘A’ through ‘G’. For the n105 band 504, the downlink frequency range extends from 612 MHz to 652 MHz and is shown with blocks of spectrum in 5 MHz increments which, for the sake of illustration, are labeled '0' through '7'. The uplink frequency range of the n105 band 504 extends from 663 MHz to 703 MHz and is shown with blocks of spectrum in 5 MHz increments which, for the sake of illustration, are labeled '0' through '7'.

In various implementations, a network operator associated with a n105 base station, such as base station 104, may have a license to only part of an n71 band or n105 band. In FIG. 5, the licensed downlink and uplink are shown as the center parts of the frequency ranges for n105 band 504—from 627 MHz to 642 MHz and from 678 MHz to 693 MHz. The licensed ranges thus have a −51 MHz transmit-receive frequency separation. All of those ranges or a subset may be used, depending on the connecting UEs and their capabilities. For an n105 UE, both licensed frequency ranges may be completely used. For n71 UEs, if those UEs support variable transmit-receive frequency separations, both licensed frequency ranges may be completely used. For n71 UEs that do not support variable transmit-receive frequency separations, the full downlink licensed frequency range may be used, but only a subset of the uplink licensed frequency range may be used. This is because n71 UEs support asymmetric channel bandwidths as defined in BCS0, BCS1, and BCS2, and those allow for some combinations of downlink 518 and uplink 520 where the length of the downlink 518 exceeds the uplink 520.

For example, the broadcast from the n105 base station may include the SSB, which in turn may include the downlink SIB1 bandwidth **506*a* (or downlink SIB1 bandwidth 506*b*), the uplink SIB1 bandwidth 508*a* (or uplink SIB1 bandwidth 508*b*), the downlink initial bandwidth part, and the uplink initial bandwidth part. The SIB1 message included in the SSB may also specific a cell specific channel bandwidth, which may be the same as a SIB1 bandwidth and smaller than a licensed bandwidth. In different implementations, different SIB1 bandwidths may be used. In one example, the downlink SIB1 bandwidth 506*a* may be 15 MHz—the same as the downlink licensed bandwidth—and the uplink SIB1 bandwidth 508*a* may be 15 MHz—the same as the uplink licensed bandwidth. In another example, the downlink SIB1 bandwidth 506*b* may be 15 MHz—the same as the downlink licensed bandwidth—and the uplink SIB1 bandwidth 508*b*** may be 10 MHz—a subset of the uplink licensed bandwidth, used for compatibility with n71 UEs.

When a n71 UE connects to the n105 base station, the n105 base station may determine that the n71 UE is an n71 UE and configure the n71 UE with uplink and downlink frequency allocations from the n71 downlink 510 and from the n71 uplink 512. In the example shown in FIG. 5, the n71 UEs are not capable of variable transmit-receive frequency allocation and receive asymmetric channel bandwidths as an allocation. Such indications of capabilities of the n71 UE and configurations from the n105 base station may be exchanged in RRC communications.

When a n105 UE connects to the n105 base station, the n105 base station may determine that the n105 UE is an n105 UE and configure the n105 UE with uplink and downlink frequency allocations using either UE specific channel bandwidths or carrier aggregation. UE specific channel bandwidths use a −51 MHz transmit-receive frequency separation between the downlink and uplink and may be taken from the entire licensed downlink range and uplink range. The UE specific channel bandwidths may also be larger than the cell specific channel bandwidth. For example, a UE specific channel bandwidth for uplink may be 15 MHz and a cell specific channel bandwidth for the uplink may be 10 MHz. In FIG. 5, the UE specific channel bandwidth downlink 514 is from 627 MHz to 642 MHz and the UE specific channel bandwidth uplink 516 is from 678 MHz to 693 MHz, and uplink and downlink frequency allocations for n105 UEs will may utilize those UE specific channel bandwidths. Also, for FIG. 5, the UE specific channel bandwidth may be the same as the cell specific channel bandwidth for the downlink such that both n71 UEs and n105 UEs receive allocations from the same full downlink licensed frequency range.

Alternatively, the n105 base station may utilize carrier aggregation to provide an effective −51 MHz transmit-receive frequency separation. In FIG. 5, because the full downlink licensed frequency range may be used, carrier aggregation is not needed for the downlink. For uplink, the primary cell for uplink may be of 10 MHz length and the secondary cell may be 5 MHz. Thus, the effective uplink is 15 MHz (10 MHz+5 MHz).

The n105 base station may configure the n105 UEs using either the UE specific channel bandwidth or carrier aggregation (depending, e.g., on what the n105 UE supports), and capabilities of the n105 UEs and configurations from the n105 base station may be exchanged in RRC communications.

Example Architectures

FIG. 6 shows an example of a system architecture for the base station, such as base station 104. As noted herein and shown in FIG. 6, base station 104 may be a n105 base station 104. Also, as shown, the base station 104 can include processor(s) 602, memory 604, and transmission interfaces 606.

The processor(s) 602 may be a CPU or any other type of processing unit. Each of the one or more processor(s) 602 may have numerous ALUs that perform arithmetic and logical operations, as well as one or more CUs that extract instructions and stored content from processor cache memory, and then executes these instructions by calling on the ALUs, as necessary, during program execution. The processor(s) 602 may also be responsible for executing all computer-executable instructions and/or computer applications stored in the memory 604.

In various examples, the memory 604 can include system memory, which may be volatile (such as RAM), non-volatile (such as ROM, flash memory, etc.) or some combination of the two. The memory 604 can also include additional data storage devices (removable and/or non-removable) such as, for example, magnetic disks, optical disks, or tape. Memory 604 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, DVD, or other optical storage, magnetic cassettes, magnetic tape, magnetic disk storage or other magnetic storage devices, or any other non-transitory medium which can be used to store the desired information and which can be accessed by the base station 104. Any such non-transitory computer-readable media may be part of the base station 104.

The memory 604 can store computer-readable instructions and/or other data associated with operations of the base station 104. For example, the memory 604 can store a scheduler 608 and a configuration module 610. The scheduler may assign specific parts of frequency bands to UEs, such as UEs 102 and 106, for uplink and downlink transmission. The configuration module 610 may be part of the scheduler 608 or separate and may determine a transmit-receive frequency spacing 612 for communications with a specific UE, may determine whether to assign frequencies on uplink and downlink using asymmetric channel bandwidths 614 for a specific UE, may determine whether to use a UE specific channel bandwidth 616 for a specific UE, and may determine whether to use carrier aggregation 618 for a specific UE. The memory 604 can also store other modules and data 620. The variable transmit-receive frequency spacings 612, asymmetric channel bandwidths 614, UE specific channel bandwidth 616, and carrier aggregation 618 illustrated in FIG. 6 may represent configuration information and/or logic associated with their respective names/functions for implementation by the configuration module 610. The other modules and data 620 can be utilized by the base station 104 to perform or enable performing any action taken by the base station 104. The other modules and data 620 can include a platform, operating system, firmware, and/or applications, and data utilized by the platform, operating system, firmware, and/or applications.

The transmission interfaces 606 can include one or more modems, receivers, transmitters, antennas, error correction units, symbol coders and decoders, processors, chips, application specific integrated circuits (ASICs), programmable circuit (e.g., field programmable gate arrays), firmware components, and/or other components that can establish connections with the UEs 102 and 106, other base stations or RAN elements, elements of a core network, and/or other network elements, and can transmit data over such connections. For example, the transmission interfaces 606 can establish a connection with a UE 102/106 over an air interface. The transmission interfaces 606 can also support transmissions using one or more radio access technologies, such as 5G NR. The transmission interfaces 606 can also be used by the base station 104 to receive the uplink transmissions and send downlink transmissions, to broadcast SIB1 messages, to engage in RRC communications, and to engage in other communications with other devices.

FIG. 7 shows an example of a system architecture for a UE, such as UE 106. As noted herein and shown in FIG. 7, UE 106 may be a n105 UE 106. Also, as shown, the UE 106 can have at least one memory 702, one or more transmission interfaces 704, processor(s) 706, a display 708, output devices 710, input devices 712, and/or a drive unit 714 including a machine readable medium 716.

In various examples, the memory 702 can include system memory, which may be volatile (such as RAM), non-volatile (such as ROM, flash memory, etc.) or some combination of the two. The memory 702 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store the desired information and which can be accessed by the UE 106. Any such non-transitory computer-readable media may be part of the UE 106.

The memory 702 can include one or more software or firmware elements, such as computer-readable instructions that are executable by the one or more processors 706. For example, the memory 702 can store computer-executable instructions associated with the capabilities module 718. The memory 702 can also store data such as supported configurations 720 and supported frequency bands 722. The memory 702 can also store other modules and data 724, which can be utilized by the UE 106 to perform or enable performing any action taken by the UE 106. The other modules and data 724 can include a UE platform, operating system, and applications, and data utilized by the platform, operating system, and applications.

The transmission interfaces 704 can include transceivers, modems, interfaces, antennas, and/or other components that perform or assist in exchanging RF communications with base stations, such as base station 104 and 108, a Wi-Fi access point, or otherwise implement connections with one or more networks. The transmission interfaces 704 can be compatible with one or more radio access technologies, such as 5G NR radio access technologies and/or LTE radio access technologies.

In various examples, the processor(s) 706 can be a CPU, a graphics processing unit (GPU), or both CPU and GPU, or any other type of processing unit. Each of the one or more processor(s) 706 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 706 may also be responsible for executing all computer applications stored in the memory 702, which can be associated with types of volatile (RAM) and/or nonvolatile (ROM) memory.

The display 708 can be a liquid crystal display or any other type of display commonly used in UEs. For example, the display 708 may be a touch-sensitive display screen and can thus also act as an input device or keypad, such as for providing a soft-key keyboard, navigation buttons, or any other type of input.

The output devices 710 can include any sort of output devices known in the art, such as the display 708, speakers, a vibrating mechanism, and/or a tactile feedback mechanism. Output devices 710 can also include ports for one or more peripheral devices, such as headphones, peripheral speakers, and/or a peripheral display.

The input devices 712 can include any sort of input devices known in the art. For example, input devices 712 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 716 can store one or more sets of instructions, such as software or firmware, that embodies any one or more of the methodologies or functions described herein. The instructions can also reside, completely or at least partially, within the memory 702, processor(s) 706, and/or transmission interface(s) 704 during execution thereof by the UE 106.

Example Operations

Figure 8:
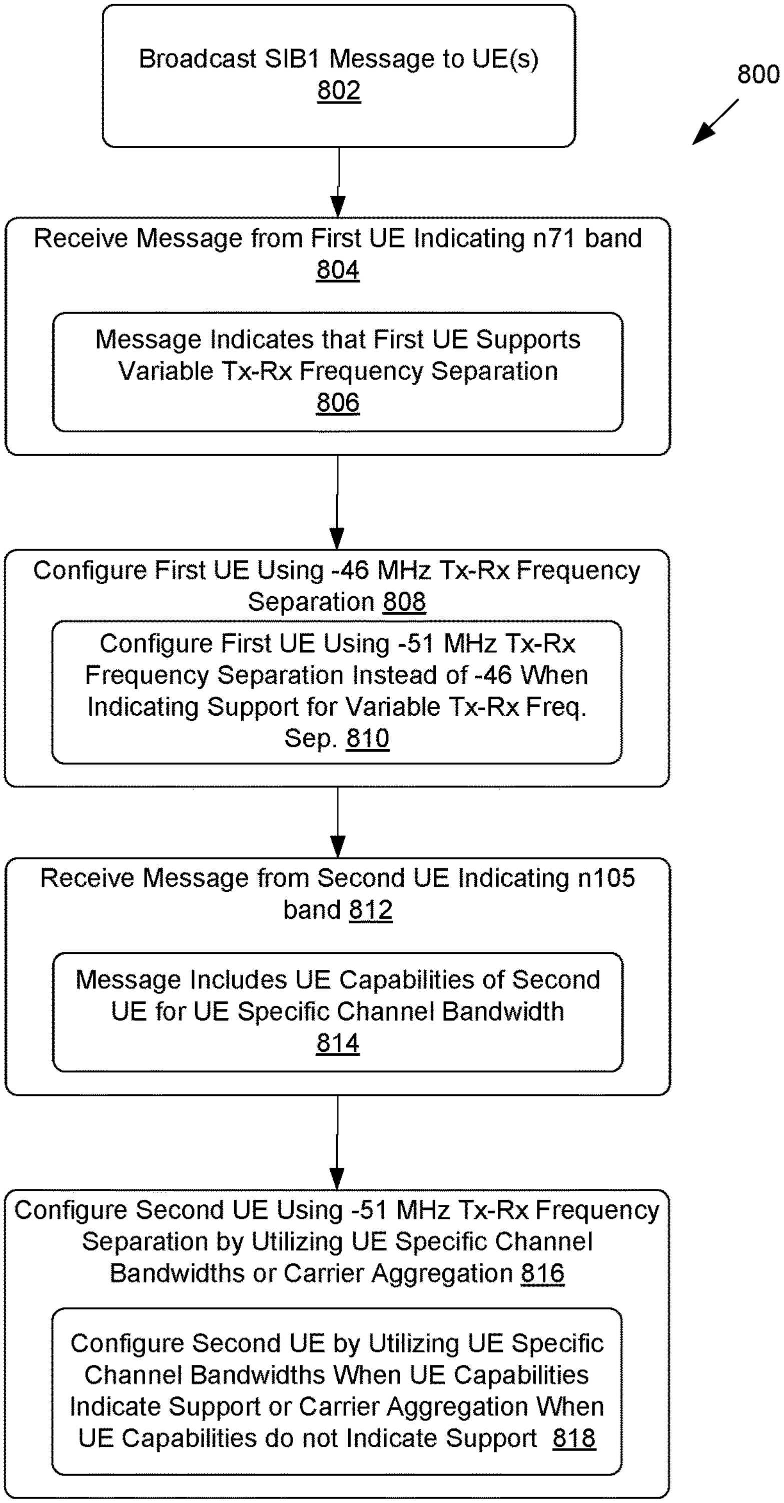
FIG. 8 shows a flowchart of an example method by which the base station configures different UEs to use different transmit-receive frequency separations.
Figure 9:
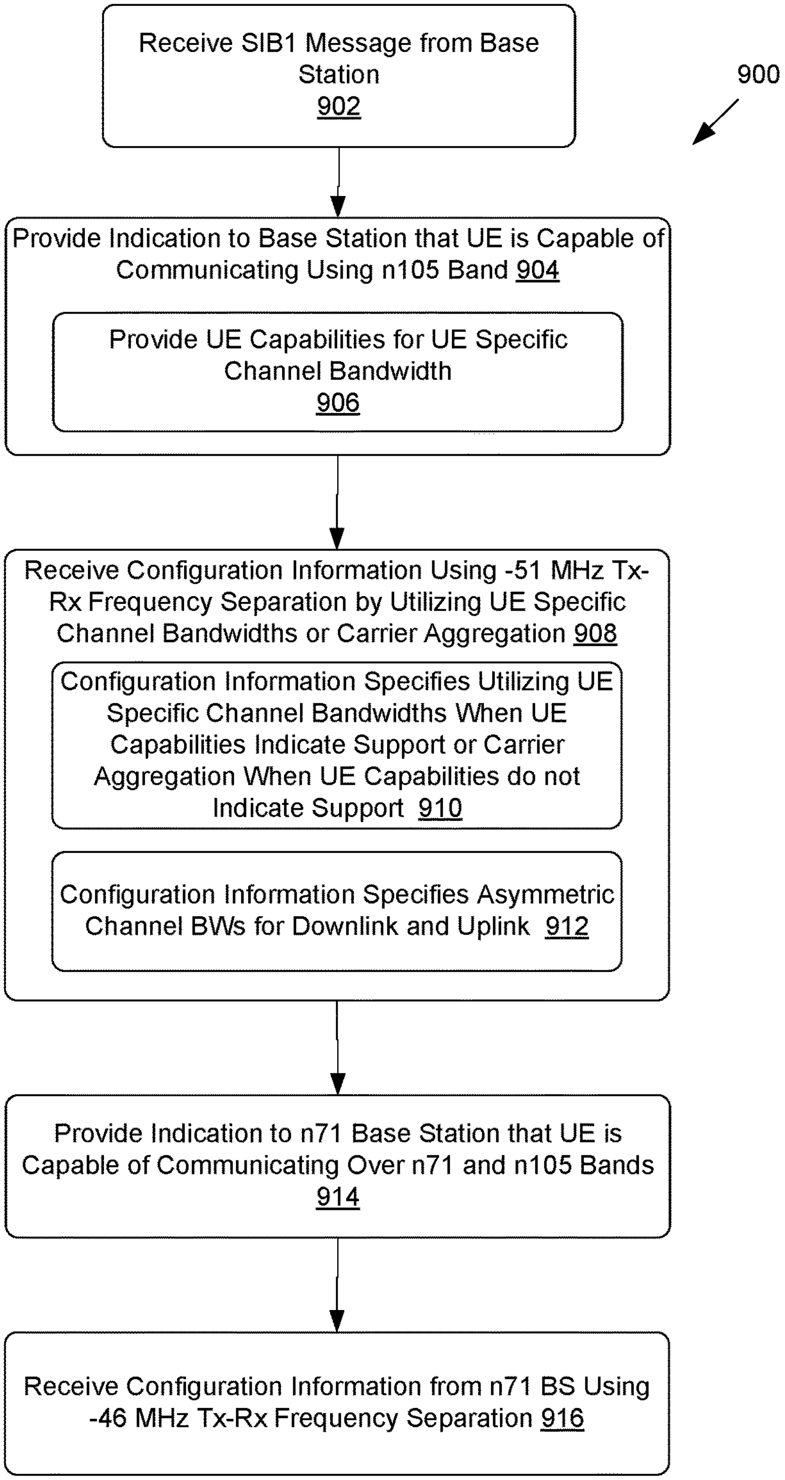
FIG. 9 shows a flowchart of an example method by which a UE is configured to use a transmit-receive frequency separation by utilizing a UE specific channel bandwidth or carrier aggregation.

FIGS. 8 and 9 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

FIG. 8 shows a flowchart 800 of an example method by which the base station configures different UEs to use different transmit-receive frequency separations. Such base stations, for example, may be 5G gNBs or base stations of newer generation(s) than 5G. As illustrated in FIG. 8 at 802, a base station may broadcast SIB1 messages. The SIB1 messages may be broadcast as part of an SSB message and may specify a cell specific channel bandwidth. For both n105 base stations 104 and n71 base stations 108, the SIB1 messages may be broadcast using a −46 MHz transmit-receive frequency separation.

At 804, the base station may receive a message from a first UE indicating that the first UE is capable of communicating on a n71 band. Such a message may be provided as part of RRC communications between the base station and the first UE. In some implementations, at 806, the message from the first UE may also include an indication that the first UE supports variable transmit-receive frequency separation.

At 808, the base station may configure the first UE with uplink and downlink spectrum allocations using a −46 MHz transmit-receive frequency separation. In some implementations, at 810, based at least in part on receiving the indication at 806, the base station may configure the first UE with uplink and downlink spectrum allocations using a −51 MHz transmit-receive frequency separation instead of the −46 MHz transmit-receive frequency separation.

At 812, the base station may receive a message from a second UE indicating that the second UE is capable of communicating on a n105 band. In some implementations, at 814, the message from the second UE may include UE capabilities of the second UE indicating that the second UE is either A) capable of utilizing the UE specific channel bandwidth or B) not capable of utilizing the UE specific channel bandwidth. In various implementations, the cell specific channel bandwidth specified in the SIB1 message is narrower than the UE specific channel bandwidth, and the SIB1 message may be of the same length as the cell specific channel bandwidth and may be narrower than the UE specific channel bandwidth.

At 816, the base station may configure the second UE with uplink and downlink spectrum allocations using a −51 MHz transmit-receive frequency separation by utilizing either a UE specific channel bandwidth or carrier aggregation. In various implementations, the UE specific channel bandwidth is not centered on a 100 KHz raster and is larger than the bandwidth of the SIB1 message. In some implementations, at 818, the base station may configure, based at least in part on the UE capabilities indicating support for the UE specific channel bandwidth, the second UE with the uplink and downlink spectrum allocations using the −51 MHz transmit-receive frequency separation by utilizing the UE specific channel bandwidth. Conversely, if the UE capabilities indicate that the second UE does not support the UE specific channel bandwidth, the base station may configure the second UE with the uplink and downlink spectrum allocations using the −51 MHz transmit-receive frequency separation by utilizing carrier aggregation. Carrier aggregation may also be used, however, when the UE capabilities indicate support for the UE specific channel bandwidth.

FIG. 9 shows a flowchart 900 of an example method by which a UE is configured to use a transmit-receive frequency separation by utilizing a UE specific channel bandwidth or carrier aggregation. As illustrated in FIG. 9 at 902, the UE may receive a SIB1 message broadcast by a base station as part of a SSB broadcast. The SIB1 message may specify a cell specific channel bandwidth and use a −46 MHz transmit-receive frequency separation.

At 904, the UE may provide an indication to the base station that the UE is capable of communicating over an n105 frequency band. In some implementations, at 906, providing the indication may comprise providing UE capabilities indicating that the UE is either A) capable of utilizing the UE specific channel bandwidth or B) not capable of utilizing the UE specific channel bandwidth.

At 908, the UE may receive from the base station configuration information specifying uplink and downlink spectrum allocations using a −51 MHz transmit-receive frequency separation by utilizing either a UE specific channel bandwidth or carrier aggregation. In various implementations, the UE specific channel bandwidth is not centered on a 100 KHz raster and is larger than the bandwidth of the SIB1 message. In some implementations, at 910, when the UE capabilities indicate that the UE is capable of utilizing the UE specific channel bandwidth, receiving the configuration information includes receiving configuration information specifying the uplink and downlink spectrum allocations using the −51 MHz transmit-receive frequency separation by utilizing the UE specific channel bandwidth. Conversely, if the UE capabilities indicate that the second UE does not support the UE specific channel bandwidth, the configuration information may specify the uplink and downlink spectrum allocations using the −51 MHz transmit-receive frequency separation by utilizing carrier aggregation. Carrier aggregation may also be used, however, when the UE capabilities indicate support for the UE specific channel bandwidth. In further implementations, at 912, the configuration information may specify asymmetric channel bandwidths for uplink and downlink, with downlink channel bandwidth being larger than uplink channel bandwidth.

At 914, the UE may provide an indication to a second base station that the UE is capable of communicating over an n71 frequency band and a n105 frequency band. The second base station may be capable of communicating over the n71 frequency band but not the n105 frequency band.

At 916, the UE may receive from the second base station configuration information specifying uplink and downlink spectrum allocations using a −46 MHz transmit-receive frequency separation.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A base station comprising:

a processor; and a plurality of programming instructions configured to be operated by the processor to perform operations including:

broadcasting a SIB1 message using a −46 MHz transmit-receive frequency separation for compatibility with n71 UEs;

receiving a message from a first user equipment (UE) indicating that the first UE is capable of communicating on a n71 band;

configuring the first UE with uplink and downlink spectrum allocations using a −46 MHz transmit-receive frequency separation;

receiving a message from a second UE indicating that the second UE is capable of communicating on a n71 band and a n105 band; and configuring the second UE, via an RRC response indicating the uplink and downlink frequency allocations, with uplink and downlink spectrum allocations using a −51 MHz transmit-receive frequency separation by utilizing carrier aggregation that at least combines a first uplink MHz range of a primary cell with a second uplink MHz range of a secondary cell and combines a first downlink MHz range of the primary cell with a second downlink MHz range of the secondary cell, wherein the base station is configured to utilize a UE specific channel bandwidth that is larger than a cell specific channel bandwidth specified in the SIB1 message.

2. The base station of claim 1, wherein at least one of the first UE and the second UE is capable of communicating with the base station using asymmetric channel bandwidths.

3. The base station of claim 1, wherein the receiving the message from the second UE comprises receiving UE capabilities of the second UE indicating that the second UE is capable of utilizing the UE specific channel bandwidth, and the configuring comprises configuring, based at least in part on the UE capabilities, the second UE with the uplink and downlink spectrum allocations using the −51 MHz transmit-receive frequency separation by utilizing the UE specific channel bandwidth.

4. The base station of claim 1, wherein the receiving the message from the second UE comprises receiving UE capabilities of the second UE indicating that the second UE is not capable of utilizing the UE specific channel bandwidth, and the configuring comprises configuring, based at least in part on the UE capabilities, the second UE with the uplink and downlink spectrum allocations using the −51 MHz transmit-receive frequency separation by utilizing carrier aggregation.

5. The base station of claim 1, wherein the receiving the message from the first UE comprises receiving an indication that the first UE supports variable transmit-receive frequency separation, and, based at least in part on receiving the indication configuring the first UE with uplink and downlink spectrum allocations using a −51 MHz transmit-receive frequency separation instead of the −46 MHz transmit-receive frequency separation.

6. The base station of claim 1, wherein the base station is a Fifth Generation (5G) gNodeB or a base station of a newer generation than 5G.

7. A method comprising:

providing, by a user equipment (UE), an indication to a first base station that the UE is capable of communicating over an n105 frequency band;

receiving, by the UE, a SIB1 message broadcast by the first base station;

receiving from the first base station, by the UE, configuration information specifying an RRC response indicating uplink and downlink spectrum frequency allocations, the RRC response specifying uplink and downlink spectrum allocations using a −51 MHz transmit-receive frequency separation by utilizing either a UE specific channel bandwidth or carrier aggregation;

providing, by the UE, an indication to a second base station that the UE is capable of communicating over a n71 frequency band and a n105 frequency band, wherein the second base station is capable of communicating over the n71 frequency band but not the n105 frequency band; and receiving from the second base station, by the UE, configuration information specifying uplink and downlink spectrum allocations using a −46 MHz transmit-receive frequency separation by utilizing carrier aggregation that at least combines a first uplink MHz range of a primary cell with a second uplink MHz range of a secondary cell and combines a first downlink MHz range of the primary cell with a second downlink MHz range of the secondary cell.

8. The method of claim 7, wherein the UE specific channel bandwidth is not centered on a 100 KHz raster.

9. The method of claim 8, further comprising receiving, by the UE, the SIB1 message broadcast by the base station, wherein the SIB1 message has a cell specific channel bandwidth that is narrower than the UE specific channel bandwidth, the SIB1 message using a −46 MHz transmit-receive frequency separation while further uplink and downlink communications between the base station and UE utilize the UE specific channel bandwidth and the −51 MHz transmit-receive frequency separation.

10. The method of claim 7, wherein providing the indication comprises providing UE capabilities indicating that the UE is capable of utilizing the UE specific channel bandwidth, and the configuration information specifies the uplink and downlink spectrum allocations using the −51 MHz transmit-receive frequency separation by utilizing the UE specific channel bandwidth.

11. The method of claim 7, wherein the configuration information from the base station specifies asymmetric channel bandwidths for uplink and downlink, with downlink channel bandwidth being larger than uplink channel bandwidth.

12. A non-transitory computer storage medium having programming instructions stored thereon that, when executed by a processor of a base station, cause the base station to perform operations comprising:

broadcasting a SIB1 message using a −46 MHz transmit-receive frequency separation for compatibility with n71 UEs;

receiving a message from a user equipment (UE) indicating that the UE is capable of communicating on a n71 band and a n105 band; and configuring the UE, via an RRC response indicating the uplink and downlink frequency allocations, with uplink and downlink spectrum allocations using a −51 MHz transmit-receive frequency separation by utilizing carrier aggregation that at least combines a first uplink MHz range of a primary cell with a second uplink MHz range of a secondary cell and combines a first downlink MHz range of the primary cell with a second downlink MHz range of the secondary cell, wherein the base station is configured to utilize a UE specific channel bandwidth that is larger than a cell specific channel bandwidth specified in the SIB1 message.

13. The non-transitory computer storage medium of claim 12, wherein the UE is a first UE and the operations further comprise:

receiving a message from a second UE indicating that the second UE is capable of communicating on a n71 band; and configuring the second UE with uplink and downlink spectrum allocations using a −46 MHz transmit-receive frequency separation.

14. The non-transitory computer storage medium of claim 13, wherein at least one of the first UE and the second UE is capable of communicating with the base station using asymmetric channel bandwidths.

15. The non-transitory computer storage medium of claim 12, wherein the receiving the message from the UE comprises receiving UE capabilities of the UE indicating that the UE is capable of utilizing the UE specific channel bandwidth, and the configuring comprises configuring, based at least in part on the UE capabilities, the UE with the uplink and downlink spectrum allocations using the −51 MHz transmit-receive frequency separation by utilizing the UE specific channel bandwidth.

16. The non-transitory computer storage medium of claim 12, wherein the receiving the message from the UE comprises receiving UE capabilities of the UE indicating that the UE is not capable of utilizing the UE specific channel bandwidth, and the configuring comprises configuring, based at least in part on the UE capabilities, the UE with the uplink and downlink spectrum allocations using the −51 MHz transmit-receive frequency separation by utilizing carrier aggregation.

17. The method of claim 7, wherein the UE is a first UE and the method further comprising:

providing, by a second UE, an indication to the first base station that the second UE is capable of communicating over a n105 frequency band;

receiving from the first base station, by the second UE, configuration information specifying uplink and downlink spectrum allocations using a −51 MHz transmit-receive frequency separation by utilizing either a UE specific channel bandwidth or carrier aggregation;

providing, by the second UE, an indication to the second base station that the second UE is capable of communicating over a n71 frequency band and a n105 frequency band, wherein the second base station is capable of communicating over the n71 frequency band but not the n105 frequency band; and receiving from the second base station, by the second UE, configuration information specifying uplink and downlink spectrum allocations using a −46 MHz transmit-receive frequency separation.

18. The base station of claim 1, wherein:

the uplink and downlink spectrum allocations for the first UE are 663 MHz to 673 MHz uplink range and 617 MHz to 627 MHz downlink range; and the uplink and downlink spectrum allocations for the second UE are 663 MHz to 678 MHz uplink range and 612 MHz to 627 MHz downlink range.

19. The base station of claim 1, wherein the SIB1 message is broadcast as part of a synchronization signal block (SSB) message.

20. The non-transitory computer storage medium of claim 12, wherein the message from the UE further includes UE capabilities indicating whether the UE supports UE specific channel bandwidths, bandwidths not centered on a 100 KHz raster, or bandwidths wider than the cell specific channel bandwidth specified in the SIB1 message.

* * * * *